(12) United States Patent
White

(10) Patent No.: US 8,015,643 B2
(45) Date of Patent: Sep. 13, 2011

(54) VEHICLE ESCAPE TOOL

(76) Inventor: James Dale White, Wasilla, AK (US)

( * ) Notice: Subject to any disclaimer, the term of this patent is extended or adjusted under 35 U.S.C. 154(b) by 192 days.

(21) Appl. No.: 12/386,926

(22) Filed: Apr. 24, 2009

(65) Prior Publication Data

US 2009/0265858 A1    Oct. 29, 2009

Related U.S. Application Data

(60) Provisional application No. 61/125,486, filed on Apr. 25, 2008.

(51) Int. Cl.
*B26B 11/00* (2006.01)
(52) U.S. Cl. .................. 7/158; 7/144
(58) Field of Classification Search ...... 7/158, 144–147, 7/170; D8/14, 81, 87, 98, 105
See application file for complete search history.

(56) References Cited

U.S. PATENT DOCUMENTS

| | | | | |
|---|---|---|---|---|
| D137,738 S | * | 4/1944 | Bradley | .................. D8/81 |
| 4,592,467 A | * | 6/1986 | Lechner | .................. 206/349 |
| 290,334 A | | 6/1987 | Reynolds, Jr. | |
| 5,251,351 A | * | 10/1993 | Klotz | .................. 7/100 |
| 356,020 A | | 3/1995 | Costa | |
| 5,642,567 A | * | 7/1997 | Lin | .................. 30/366 |
| 385,711 A | | 11/1997 | Alchin | |
| 413,781 A | | 9/1999 | Wong | |
| 417,130 A | | 11/1999 | Hollinger | |
| 420,269 A | | 2/2000 | Ben-Moshe | |
| D420,269 S | * | 2/2000 | Ben-Moshe | .................. D8/81 |
| 6,282,740 B1 | | 9/2001 | Sobotka | |
| 459,190 A1 | | 6/2002 | Chen | |
| 472,444 A1 | | 4/2003 | Gesheit | |
| 6,574,816 B2 | * | 6/2003 | Yu Chen | .................. 7/100 |
| 498,401 A1 | | 11/2004 | Lin et al. | |
| 499,003 A1 | | 11/2004 | Chiang | |
| D571,180 S | * | 6/2008 | Marshall | .................. D8/98 |
| 577,562 A1 | | 9/2008 | Lin et al. | |
| 7,487,565 B1 | * | 2/2009 | Sundling et al. | .................. 7/158 |
| 7,557,720 B2 | * | 7/2009 | Rubin et al. | .................. 340/574 |

* cited by examiner

*Primary Examiner* — David B Thomas
(74) *Attorney, Agent, or Firm* — Robert O. Blinn

(57) ABSTRACT

An emergency tool for escaping from a motor vehicle has a generally symmetrical body including a handle portion and a cutting portion. The handle portion carries two opposite window breaking elements adapted for breaking and shattering tempered motor vehicle window glass. The cutting portion includes opposite cutters having fingers which define slots for receiving belt webbing material. The cutting slots lead to sharp blades fixed at the closed end of each slot which are adapted for cutting the belt webbing material of motor vehicle seat belts. The body optionally includes at least one compartment for carrying an emergency item such as a fire starting flare or an emergency locating transmitter and may also incorporate optional LED lights to provide illumination for emergency operations.

16 Claims, 2 Drawing Sheets

VEHICLE ESCAPE TOOL

CROSS REFERENCES TO RELATED APPLICATIONS

The application claims the benefit of U.S. Provisional application Ser. No. 61/125,486 filed on 25 Apr. 2008 which is incorporated herein by reference.

FIELD OF THE INVENTION

This invention relates to a hand tool for rapidly escaping from an automobile during an emergency.

BACKGROUND OF THE INVENTION

A motor vehicle occupant can encounter an emergency in which it is necessary to rapidly escape the motor vehicle. In such emergencies, it may be necessary to quickly cut a seatbelt strap and to break out a window in order to escape from an overturned or submerged vehicle. In the aftermath of an accident or when a vehicle is submerged, doors and windows are typically jammed or inoperative. In such an emergency situation, seat belts are often under tension which may render a seatbelt buckle release mechanism inoperative. During such emergencies, a vehicle occupant may be under extreme emotional and physical stress and thus may lack concentration to perform complex tasks or lack manual dexterity to perform intricate mechanical operations. Accordingly, what is needed is a tool which may be easily and quickly grasped by the vehicle occupant and which, the vehicle occupant may, with gross motor movements and limited dexterity, with either hand, perform simple tasks such as cutting seat belts and breaking out a car window with the utmost speed. Since the tool may be the only useful item carried by the escaping occupant, it would also be advantageous if the tool included a compartment for carrying survival items. Moreover, since the tool may be used in a remote location, at night, in a condition of total darkness, it would also be highly advantageous if the tool included at least one integral light source for illuminating the above described emergency tasks.

BRIEF DESCRIPTION

The above stated needs are addressed by a vehicle escape tool including a symmetrical handle portion, opposing symmetrical window breaking elements and opposing symmetrical blade units for cutting seat belts. In an example embodiment, the handle portion includes at least one compartment for carrying pre-selected survival gear such as, for example, a compact flare for starting a fire. The Handle portion optionally includes clips suitable for engaging a motor vehicle windshield sunvisor. The body of the escape tool may also incorporate lights for illuminating emergency operations. When employed by a trapped vehicle occupant, the left handed or right handed occupant (or an occupant using a remaining hand which is uninjured) grasps the escape tool, cuts his or her seat belts and breaks out a window in order to escape from the vehicle. Because the tool is symmetrical, it may be grasped and used with equal effectiveness by either a right handed or left handed person. Optionally, the escape tool may include a compartment for carrying such items as an emergency locator transmitter, a device for starting fires, a first aid kit or a medication container or a self defense weapon.

DETAILED DESCRIPTION

Figure 1:
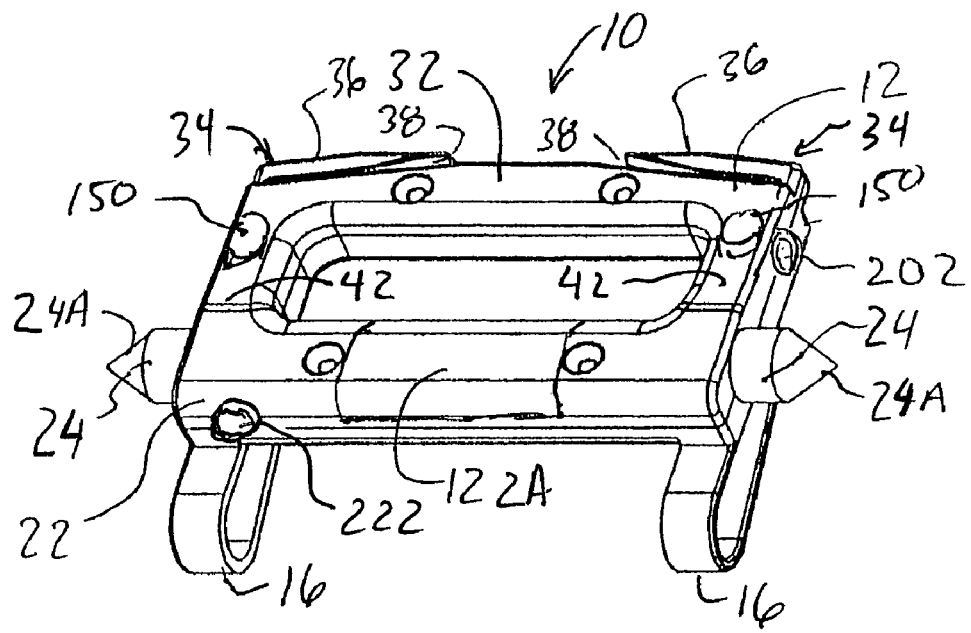
FIG. 1 is a first perspective view of the vehicle escape tool.
Figure 2:
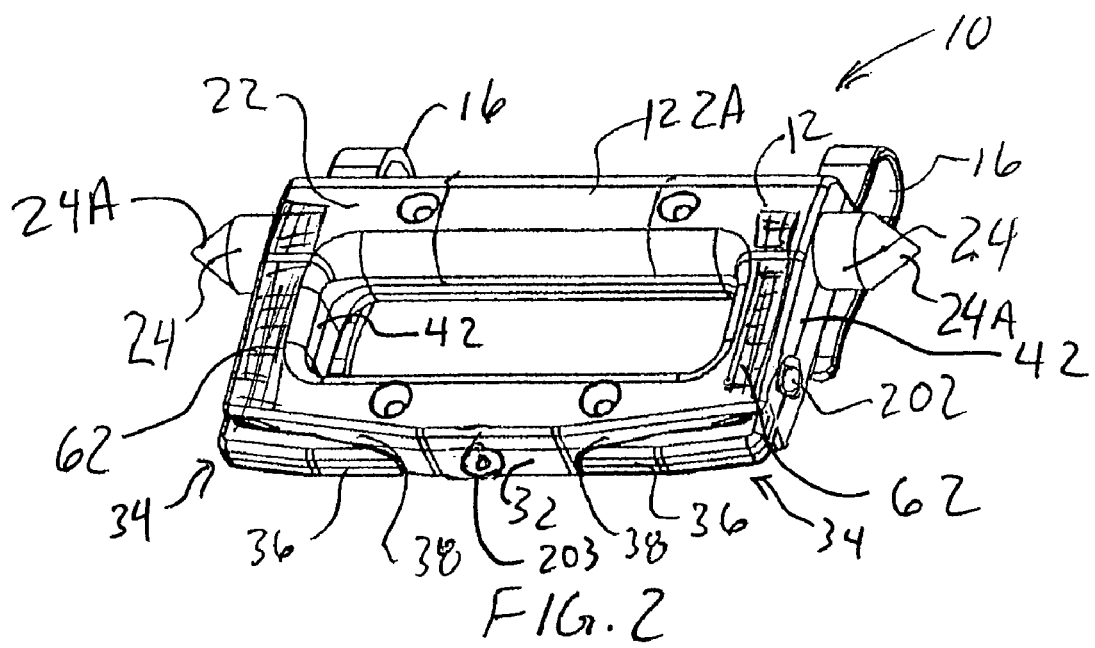
FIG. 2 is a second perspective view of the vehicle escape tool.

Referring to FIGS. 1 and 2, an example escape tool 10 is shown including a housing 12 defining a handle portion 22 and a cutting portion 32. Handle portion 22 carries two opposite and generally identical window breaker elements 24 as well as sunvisor clips 16. Cutting portion 32 includes two symmetrically opposite cutters 34 which will be described in greater detail below.

Figure 3:
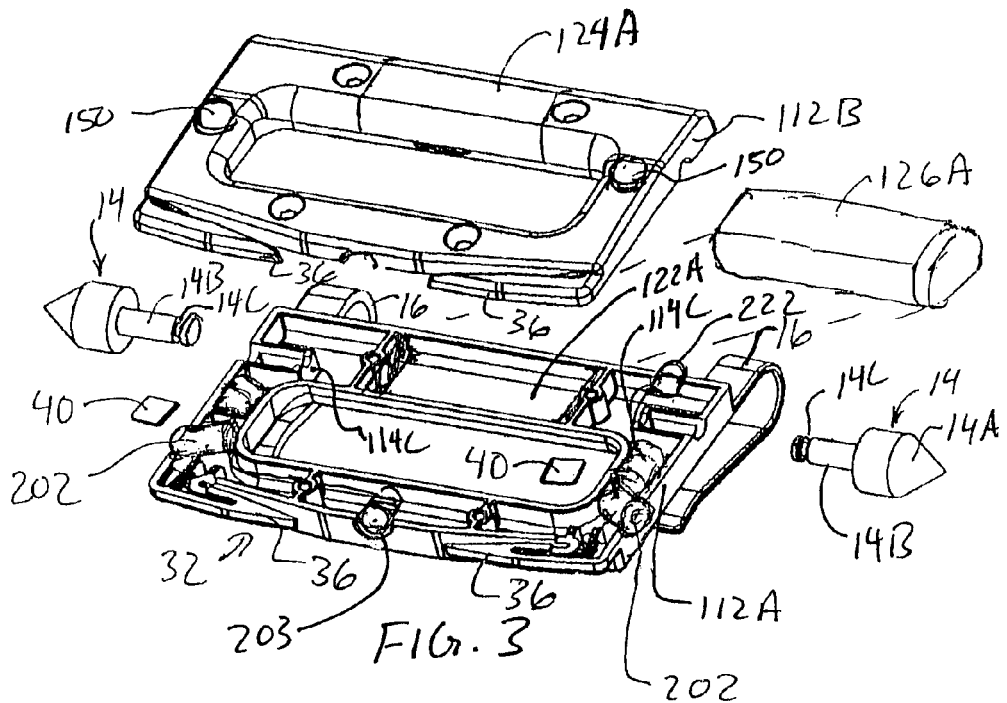
FIG. 3 is an exploded perspective view of the escape tool.
Figure 4:
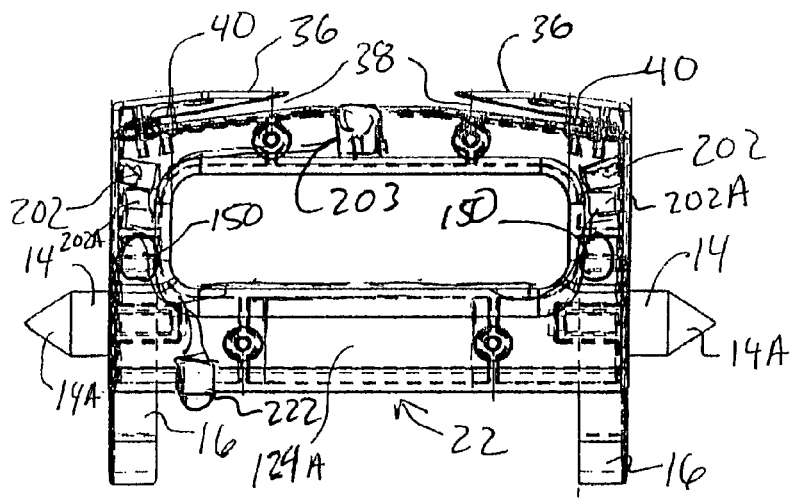
FIG. 4 is a plan view of the escape tool.
Figure 5:
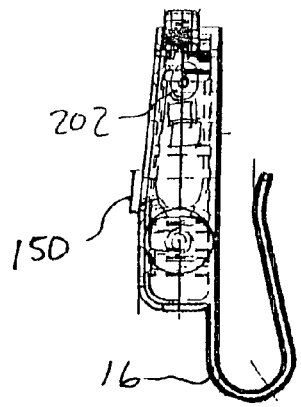
FIG. 5 is a side view of the escape tool.

As can be seen in FIGS. 1 and 2, housing 12 is generally symmetrical as are the features associated with housing 12. Housing 12 includes a handle portion 22 and a cutting portion 32. Handle portion 22 and cutting portion 32 are held in a spaced, generally parallel relationship by at least one connecting member 42. In the preferred embodiment shown in FIGS. 1 and 2, two widely spaced connecting members 42 connect between the opposite ends of handle portion 22 and cutting portion 32. Handle portion 22 is preferably shaped and sized to be easily grasped by either the left or right hand of an adult motor vehicle occupant. As can be seen in FIGS. 3 and 4, housing 12 may be fashioned from two matching injection molded plastic housing shells 112A and 112B.

Each of the two opposite ends of handle portion 22 carry a window breaker element 14 which has a pointed portion 14A. Pointed portion 14A is adapted to shatter tempered motor vehicle glass upon impact when swung with moderate force by an adult person as will be readily understood by a skilled reader familiar with the properties of tempered motor vehicle glass. Typically window breaker elements 14 may be fashioned from steel or a hard ceramic material or any other suitable tough, hard material. The material for pointed portion 14A may also be a relatively dense material to aid in the breaking and shattering of tempered motor vehicle glass. Window breaker elements 14 also include an anchor portion 14B which, in this example, includes a radial recess 14C. Radial recess 14C receives corresponding flanges 114C molded into housing shells 112A and 112B such that when housing shells 112A and 112B are bonded together with window breaker elements 14 in place as shown in FIG. 4, window breaker elements 14 are firmly anchored as flanges 114C engage radial recesses 14C within the resulting assembled housing 12. Optional clips 16 may be added to handle portion 22 for securing escape tool 10 to a vehicle sunvisor or the like. Further, as shown in FIG. 2, optional patches of hook and loop fastening material 62 may be added to at least one of the outside surfaces of housing 12 for mounting to a vehicle surface having a corresponding patch of hook and loop fastening material.

Figure 6:
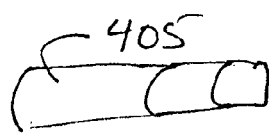
FIG. 6 illustrates various emergency items for placement in an emergency item compartment of the vehicle escape tool.
Figure 6:
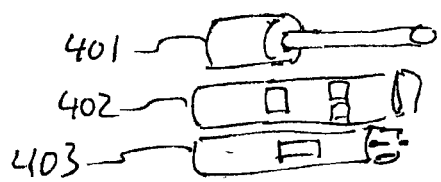

As is shown in FIGS. 3 and 4, handle portion 22 may optionally include an emergency item compartment 122A. Compartment 122A may have a removable cover 124A, which, when removed exposes an internal compartment within handle portion 22. As can be seen in FIG. 3, an optional container 126A is adapted to fit within compartment 122A. Various items may be selected for storage in optional container 126A are illustrated in FIG. 6. For example, optional container 126A may contain a magnesium flare fire starter 401. A user who may have escaped from a submerged vehicle in an unpopulated area in cold weather may use a magnesium flare fire starter to start a fire by igniting virtually any combustible material. In some weather conditions, the ability to start a fire might save the motor vehicle occupant's life. Optional container 126A may contain an emergency locator transmitter 402. People who travel in highly populated areas may wish to carry a weapon in optional container 126A such as a compact electronic muscular disruption device 403 or a compact pepper spray device 404. Still further, optional storage container 126A may be used to carry first aid container 405 possibly for carrying essential medications for users who may have a medical condition such as diabetes or a heart condition or a snake bite kit. Even still further, optional storage container 126A may be used to carry any combination of two or more of the above elements. Although not an emergency item, compartment 122A may be used to house a garage door opener transmitter.

Optional magnets 150 may be added to the handle portion. Preferably optional magnets 150 should be fashioned from strong rare earth magnets or equivalents. Optional magnets 150 may be used to mount emergency tool 10 to a ferrous metal surface such as, for example, the interior of the hood of a vehicle or on the side of a vehicle near a wheel to aid in changing a tire. For example, if vehicle escape tool 10 included optional lights 202 and 203, an operator could use magnets 150 to mount vehicle escape tool 10 on the side of a vehicle body to illuminate an operation such as changing a tire.

Cutter portion 32 is disposed generally opposite handle portion 22. Cutter portion 32 includes two opposite cutters 34 each of which include a cutter guide finger 36 which defines a belt slot 38 having a recessed blade 40. Cutter portion 32 is arranged to enable a user to cut nylon seatbelt straps or to cut child seat straps with the utmost speed and with limited skill and dexterity. Blades 40 are captured between housing shells 112A and 112B so that they are firmly anchored in housing 12. Blades 40 are preferably fashioned from a very hard steel alloy or other suitable material for taking a sharp cutting edge and should be sufficiently tough and sharp to easily slice through the webbing of a typical motor vehicle seat belt. A user who is cutting a nylon belt guides the belt into one of the opposite slots 38 and then slices through the belt with one of blades 40. Cutter portion 32 is arranged so that blades 40 are available for cutting straps which are guided into belt slot 38 but are also arranged so that blades 40 are not exposed and thus are not likely to cut one using vehicle escape tool 10 or a passenger who the user may be helping.

Escape tool 10 may optionally include lights 202 and 203 which are preferably LED lights which will continue to produce light with relatively small amounts of electric power. Lights 202 and 203 may be powered by compact batteries 202A and may be activated by a switch 222 incorporated into handle portion 22 as described below. Lights 202 and 203 may be red lights for preserving night vision. This would be particularly useful for pilots who wish to read charts and also wish to preserve night vision. With optional lights 202 and 203, an operator may illuminate a work area while severing a seat belt or breaking out a vehicle window. It is preferable that optional lights 202 and 203 are arranged so that optional lights 202 continue to operate even when escape tool 10 is submerged in water. Although lights 202 and 203 are optional, they may be highly desirable in some situations. A motor vehicle occupant of a submerged motor vehicle with a failed electrical system on a moonless overcast night in an area remote from urban lights will be in total darkness. Lights 202 and 203 are preferably placed on the outside surfaces of connecting members 42 and on the outside surface of cutting member 32 between cutting fingers 36 as shown in FIGS. 1 and 2. First and second lights 202 are useful for illuminating a window breaking operation. Third light 203 is useful for illuminating a strap cutting operation as described above. It is preferable to control the operations of lights 202 and 203 with a sealed, push button toggle switch 222 located on one end and on the outside surface of handle portion 22 as shown in FIG. 1.

Escape tool 10 may be used as follows. Typically, escape tool 10 may be mounted to a vehicle visor using clips 16 or may be mounted to a vehicle surface such as a dashboard surface using hook and loop fabric pads 62 shown in FIG. 2. Still further, optional magnets 150 may be used to mount escape tool 10 to a metal surface. When an emergency occurs such as a vehicle roll over or a vehicle entering a body of water either while upright, turned on its side or inverted, the occupant grasps handle portion 22. If the vehicle is upright and seatbelts can be unlatched by disengaging their latches, the operator can merely unlatch the seatbelts. If it is not possible to open a door to escape the motor vehicle, the operator can swing escape tool 10 so that window breaking element impacts a window and shatters a window to provide a means for escape. If the vehicle is not upright or the seatbelts are jammed, the user should first cut through the seat belts and then shatter a window for escaping the vehicle. In a circumstance where the vehicle is overturned or submerged or both, this must be done with the utmost speed. Escape tool 10 may also be used by a pilot or passenger to escape a light aircraft. This is especially true when light aircraft are ditched in a body of water. In many such cases a light aircraft will become inverted and occupants will have great difficulty unlatching seatbelts.

It is to be understood that while certain forms of this invention have been illustrated and described, it is not limited thereto, except in so far as such limitations are included in the following claims and allowable equivalents thereof:

Having thus described the invention, what is claimed as new and desired to be secured by Letters Patent is:

1. An emergency escape tool for escaping a motor vehicle, comprising:
  (a) a body including a handle portion and cutting portion, the body fashioned from a generally symmetric housing, the body including a handle portion and a cutting portion, the handle portion and the cutting portion being generally elongated and being spaced in a generally parallel relationship and being connected by two connecting members that connect between the opposite ends of the handle portion and the cutting portion,
  (b) the handle portion adapted for grasping by the hand of an adult person and including two window breaking elements each having a pointed distal end and a proximate end which is securely fixed to one of the opposite ends of the handle portion thereby presenting two opposite window breaking points that project outwardly in opposite directions at the opposite ends of the handle portion, the window breaking elements sufficiently hard and sharp to shatter tempered motor vehicle window glass when swung by a user so as to cause one of the window breaking elements to strike the surface of the tempered motor vehicle window glass,
  (c) the cutting portion including oppositely directed fingers that are disposed on an outside surface of the cutting portion, each finger and the outside surface of the cutting portion defining a cutting slot that extends from a closed end to an open end, the cutting portion further including a cutting blade fixed at the closed end of each cutting slot, each cutting slot adapted to receive and guide a seat belt strap toward the cutting blade for cutting and each of the cutting blades sufficiently sharp and strong to cut through a motor vehicle seat belt strap.

2. The emergency escape tool as set forth in claim 1, further comprising:
  at least one compartment disposed in the body for carrying an emergency item.

3. The emergency escape tool as set forth in claim 1, further comprising:
at least one compartment disposed in the body for carrying at least one emergency item selected from the group consisting of: a first aid kit, a medication container holding essential medication, an emergency locator transmitter, a fire starting flare and a signal flare.

4. The emergency escape tool as set forth in claim 1, further comprising:
at least one light and a switch for activating the light which are disposed in the body.

5. The emergency escape tool as set forth in claim 1, further comprising:
at least one light and a switch for activating the light which are disposed in the body and the at least one light is a red light for preserving night vision.

6. The emergency escape tool as set forth in claim 1, further comprising:
at least one compartment disposed in the body for carrying an emergency item, and,
at least one light and a switch for activating the light which are disposed in the body.

7. An emergency escape tool for escaping a motor vehicle, comprising:
(a) a body including a handle portion and a cutting portion, the body including at least one compartment disposed in the body for carrying an emergency item, and, at least two LED lights disposed in the body and a switch disposed in the body for activating the LED lights,
(b) the handle portion adapted for grasping by the hand of an adult person and including two window breaking elements each having a pointed distal end and a proximate end that is securely fixed to one of the opposite ends of the handle portion thereby presenting two opposite window breaking points which project outwardly in opposite directions at the opposite ends of the handle portion, the window breaking elements sufficiently hard and sharp to shatter tempered motor vehicle window glass when swung by a user so as to cause one of the window breaking elements to strike the surface of tempered motor vehicle window glass,
(c) the cutting portion spaced away from the handle portion and connected to the handle portion by at least one connecting member, the cutting portion including oppositely directed fingers that are disposed on an outside surface of the cutting portion, each finger and the outside surface of the cutting portion defining a cutting slot that extends from a closed end to an open end, the cutting portion further including a cutting blade fixed at the closed end of each cutting slot, each cutting slot adapted to receive and guide a seat belt strap toward the cutting blade for cutting and each of the cutting blades sufficiently sharp and strong to cut through a motor vehicle seat belt strap, and
(d) the at least two LED lights disposed in the body oriented to illuminate the use of the window breaking points and the use of the cutting blades of the cutting portion.

8. An emergency escape tool for escaping a motor vehicle, comprising:
(a) a body fashioned from a generally symmetric housing, the body including a handle portion and a cutting portion, the handle portion and the cutting portion being generally elongated and being spaced in a generally parallel relationship and being connected by two connecting members which connect between the opposite ends of the handle portion and the cutting portion,
(b) the handle portion adapted for grasping by the hand of an adult person and including two window breaking elements having pointed distal ends and being securely fixed to the opposite ends of the handle portion thereby presenting two oppositely extending window breaking points at the opposite ends of the handle portion, the window breaking elements sufficiently sharp and hard to shatter tempered motor vehicle window glass when swung by a hand of a user so as to cause one of the window breaking elements to strike the surface of tempered motor vehicle window glass,
(c) the cutting portion including oppositely directed fingers that are disposed on an outside surface of the cutting portion, each finger and the outside surface of the cutting portion defining a cutting slot that extends from a closed end to an open end, the cutting portion further including two sharp cutting blades fixed at the closed end of each cutting slot, each cutting slot adapted to receive and guide a seat belt strap to the cutting blade, each of the cutting blades sufficiently sharp and strong to cut through a seat belt strap.

9. The emergency escape tool as set forth in claim 8, further comprising:
at least one compartment disposed in the body for carrying an emergency item.

10. The emergency escape tool as set forth in claim 8, further comprising:
at least one compartment disposed in the body for carrying at least one emergency item selected from the group consisting of: a first aid kit, a medication container holding essential medication, an emergency locator transmitter, a fire starting flare and a signal flare.

11. The emergency escape tool as set forth in claim 8, further comprising:
at least one light and a switch for activating the light which are disposed in the body.

12. The emergency escape tool as set forth in claim 8, further comprising:
at least one light and a switch for activating the light which are disposed in the body and the at least one light is red for preserving night vision.

13. The emergency escape tool as set forth in claim 8, further comprising:
at least one compartment disposed in the body for carrying an emergency item, and,
at least one light and a switch for activating the light which are disposed in the body.

14. The emergency escape tool as set forth in claim 8, further comprising:
at least one compartment disposed in the body for carrying an emergency item, and,
at least two lights disposed in the body and a switch disposed in the body for activating the lights wherein the lights are LED light sources and wherein the lights are oriented to illuminate the use of the window breaking points and the use of the cutting blades of the cutting portion.

15. The emergency escape tool as set forth in claim 8, further comprising:
at least one clip secured to the body for mounting the escape tool to a vehicle window visor.

16. The emergency escape tool as set forth in claim 8, further comprising:
at least one hook and loop fastener patch secured to an outside surface of the body of the escape tool for securing the escape tool to a corresponding hook and loop fastener patch secured to another surface.

* * * * *